US006223152B1

(12) United States Patent
Lin et al.

(10) Patent No.: US 6,223,152 B1
(45) Date of Patent: Apr. 24, 2001

(54) MULTIPLE IMPULSE EXCITATION SPEECH ENCODER AND DECODER

(75) Inventors: Daniel Lin, Montville, NJ (US); Brian M. McCarthy, Lafayette Hill, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 09/441,743

(22) Filed: Nov. 16, 1999

Related U.S. Application Data

(63) Continuation of application No. 08/950,658, filed on Oct. 15, 1997, now Pat. No. 6,006,174, which is a continuation of application No. 08/670,986, filed on Jun. 28, 1996, now abandoned, which is a continuation of application No. 08/104,174, filed on Aug. 9, 1993, now abandoned, which is a continuation of application No. 07/592,330, filed on Oct. 3, 1990, now Pat. No. 5,235,670.

(51) Int. Cl.[7] .................................................... G01L 19/00

(52) U.S. Cl. .......................... 704/207; 704/217; 704/225

(58) Field of Search ................................... 704/207, 208, 704/216, 217, 218, 219, 220, 221, 222, 225

(56) References Cited

U.S. PATENT DOCUMENTS

| | | | | |
|---|---|---|---|---|
| 4,618,982 | * | 10/1986 | Horvath et al. | 704/219 |
| 4,669,120 | * | 5/1987 | Ono | 704/216 |
| 4,776,015 | | 10/1988 | Takeda et al. . | |
| 4,815,134 | | 3/1989 | Picone et al. . | |
| 4,845,753 | * | 7/1989 | Yasunaga | 704/217 |
| 4,868,867 | | 9/1989 | Davidson et al. . | |
| 4,890,327 | * | 12/1989 | Bertrand et al. | 704/219 |
| 4,980,916 | | 12/1990 | Zinser . | |
| 4,991,213 | | 2/1991 | Wilson . | |
| 5,001,759 | | 3/1991 | Fukui . | |
| 5,027,405 | | 6/1991 | Ozawa . | |
| 5,235,670 | * | 8/1993 | Lin et al. | 704/200 |
| 5,265,167 | * | 11/1993 | Akamine et al. | 704/220 |
| 5,307,441 | * | 4/1994 | Tzeng | 704/222 |
| 5,999,899 | * | 12/1999 | Robinson | 704/219 |

FOREIGN PATENT DOCUMENTS

WO86/02726 6/1986 (WO) .

OTHER PUBLICATIONS

Veeneman et al., "Computationally efficient stochastic coding of speech," 1990 IEEE 40th Vehicular Technology Conference, May 1990, pp. 331 to 335.*

Proc. ICASSP '82, A New Model of LPC Excitation for Producing Natural–Sounding Speech at Low Bit Rates, B.S. Atal and J.R. Remde, pp. 614–617, Apr., 1982.

Proc. ICASSP '84, Improving Performance of Multi–Pulse Coders at Low Bit Rates, S. Singhal and B.S. Atal, paper 1.3, Mar. 1984.

Proc. ICASSP '84, Efficient Computation and Encoding of the Multiple Excitation for LPC, M. Berouti et al., paper 10.1, Mar., 1984.

Proc. ICASSP '86, Implementation of Multi–Pulse Coder on a Single Chip Floating–Point Signal Processor, H. Alrutz, paper 44.3, Apr., 1986.

Digital Telephony, John Bellamy, pp. 153–154, 1991.

* cited by examiner

*Primary Examiner*—David Hudspeth
*Assistant Examiner*—Martin Lerner
(74) *Attorney, Agent, or Firm*—Volpe and Koenig, P.C.

(57) ABSTRACT

To perform pitch analysis for encoding a speech signal, a speech signal is sampled. The sampled speech signal is spectrally whitened to produce a spectral residual signal. Samples of the spectral residual signal are collected and the collected samples are autocorrelated. Maximum values of the correlated result are determined. Gain values are determined based on at least in part the maximum values of the correlated result. The gain values are quantized using a codebook to produce a codebook index and an associated frame delay. The codebook index and the frame delay represent a pitch of the speech signal to facilitate encoding the speech signal.

17 Claims, 12 Drawing Sheets

REFLECTION COEFFICIENT QUANTIZATION

L P C INTERPOLATION / WEIGHTING

GENERATE IMPULSE RESPONSE

PERCEPTUAL SYNTHESIZER

MULTIPLE IMPULSE EXCITATION SPEECH ENCODER AND DECODER

REFERENCES TO RELATED APPLICATIONS

This application is a continuation of application Ser. No. 08/950,658, filed Oct. 15, 1997, now U.S. Pat. No. 6,006,174, which is a continuation of application Ser. No. 08/670,986, filed Jun. 28, 1996, now abandoned, which is a continuation of application Ser. No. 08/104,174, filed Aug. 9, 1993, now abandoned, which is a continuation of application Ser. No. 07/592,330, filed Oct. 3, 1990, which issued on Aug. 10, 1993 as U.S. Pat. No. 5,235,670.

FIELD OF THE INVENTION

This invention relates to digital voice coders performing at relatively low voice rates but maintaining high voice quality. In particular, it relates to improved multipulse linear predictive voice coders.

BACKGROUND OF THE INVENTION

The multipulse coder incorporates the linear predictive all-pole filter (LPC filter). The basic function of a multipulse coder is finding a suitable excitation pattern for the LPC all-pole filter which produces an output that closely matches the original speech waveform. The excitation signal is a series of weighted impulses. The weight values and impulse locations are found in a systematic manner. The selection of a weight and location of an excitation impulse is obtained by minimizing an error criterion between the all-pole filter output and the original speech signal. Some multipulse coders incorporate a perceptual weighting filter in the error criterion function. This filter serves to frequency weight the error which in essence allows more error in the formant regions of the speech signal and less in low energy portions of the spectrum. Incorporation of pitch filters improve the performance of multipulse speech coders. This is done by modeling the long term redundancy of the speech signal thereby allowing the excitation signal to account for the pitch related properties of the signal.

SUMMARY OF THE INVENTION

The basic function of the present invention is the finding of a suitable excitation pattern that produces a synthetic speech signal which closely matches the original speech. A location and amplitude of an excitation pulse is selected by minimizing the mean-squared error between the real and synthetic speech signals. The above function is provided by using an excitation pattern containing a multiplicity of weighted pulses at timed positions.

The selection of the location and amplitude of an excitation pulse is obtained by minimizing an error criterion between a synthetic speech signal and the original speech. The error criterion function incorporates a perceptual weighting filter which shapes the error spectrum.

DETAILED DESCRIPTION

This invention incorporates improvements to the prior art of multipulse coders, specifically, a new type LPC spectral quantization, pitch filter implementation, incorporation of pitch synthesis filter in the multipulse analysis, and excitation encoding/decoding.

Figure 1:
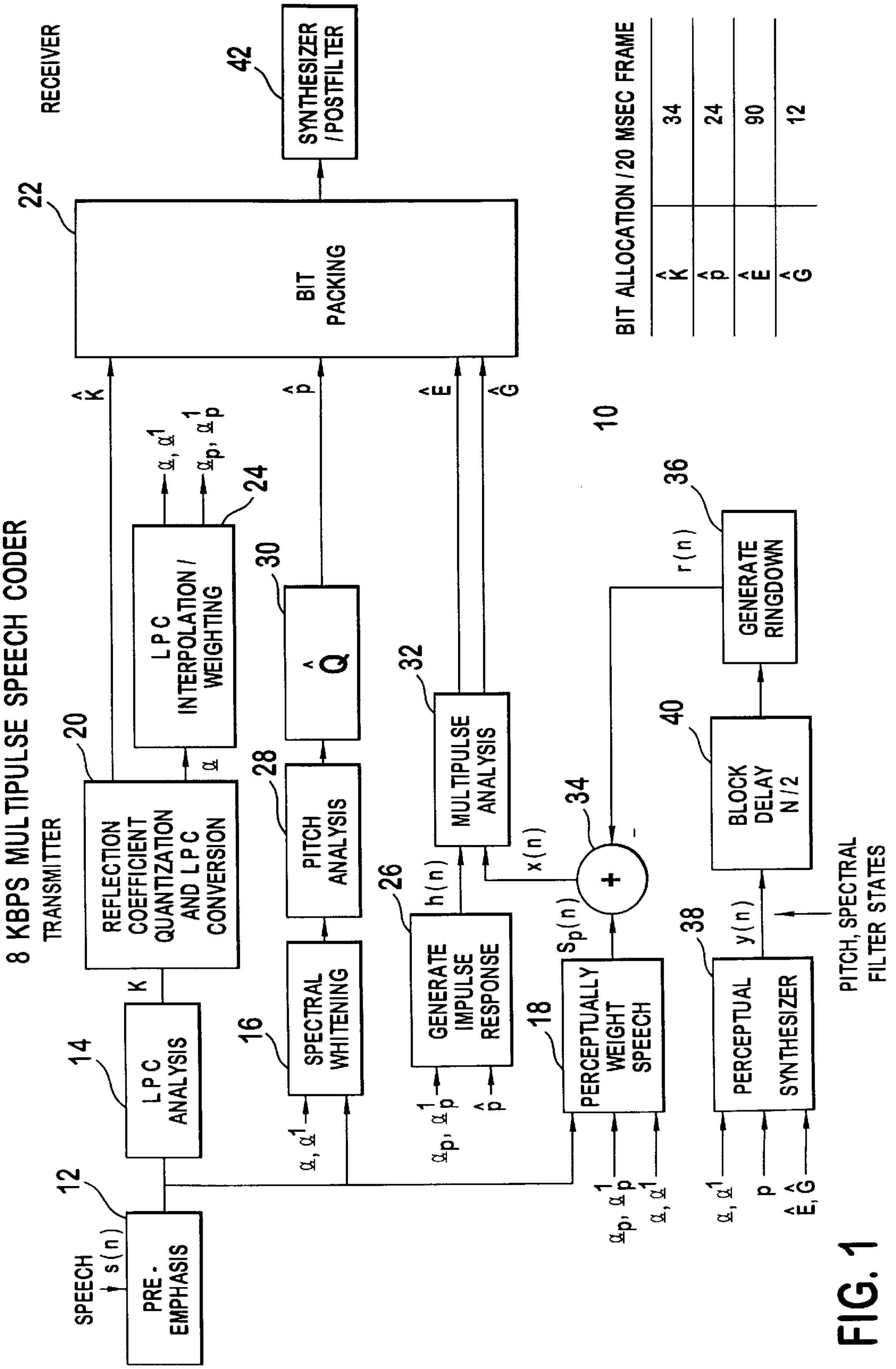
FIG. 1 is a block diagram of an 8 kbps multipulse LPC speech coder.

Shown in FIG. 1 is a block diagram of an 8 kbps multipulse LPC speech coder, generally designated 10.

It comprises a pre-emphasis block 12 to receive the speech signals s(n). The pre-emphasized signals are applied to an LPC analysis block 14 as well as to a spectral whitening block 16 and to a perceptually weighted speech block 18.

The output of the block 14 is applied to a reflection coefficient quantization and LPC conversion block 20, whose output is applied both to the bit packing block 22 and to an LPC interpolation/weighting block 24.

The output from block 20 to block 24 is indicated at $\underline{\alpha}$ and the outputs from block 24 are indicated at $\underline{\alpha}$, $\underline{\alpha}^1$, and at $\underline{\alpha}_p$, $\underline{\alpha}^1_p$.

The signal $\underline{\alpha}$, $\underline{\alpha}^1$ is applied to the spectral whitening block 16 and the signal $\underline{\alpha}_p$, $\underline{\alpha}^1_p$ is applied to the impulse generation block 26.

The output of spectral whitening block 16 is applied to the pitch analysis block 28 whose output is applied to quantizer block 30. The quantized output P from quantizer 30 is applied to the Sp(n) and also as a second input to the impulse response generation block 26. The output of block 26, indicated at h(n), is applied to the multipulse analysis block 32.

The perceptual weighting block 18 receives both outputs from block 24 and its output, indicated at Sp(n), is applied to an adder 34 which also receives the output r(n) from a ringdown generator 36. The ringdown component r(n) is a fixed signal due to the contributions of the previous frames. The output x(n) of the adder 34 is applied as a second input to the multipulse analysis block 32. The two outputs $\hat{E}$ and $\hat{G}$ of the multipulse analysis block 32 are fed to the bit packing block 22.

The signals $\underline{\alpha}$, $\underline{\alpha}^1$, P and $\hat{E}$, $\hat{G}$ are fed to the perceptual synthesizer block 38 whose output y(n), comprising the combined weighted reflection coefficients, quantized spectral coefficients and multipulse analysis signals of previous frames, is applied to the block delay N/2 40. The output of block 40 is applied to the ringdown generator 36.

The output of the block 22 is fed to the synthesizer/postfilter 42.

Figure 2:
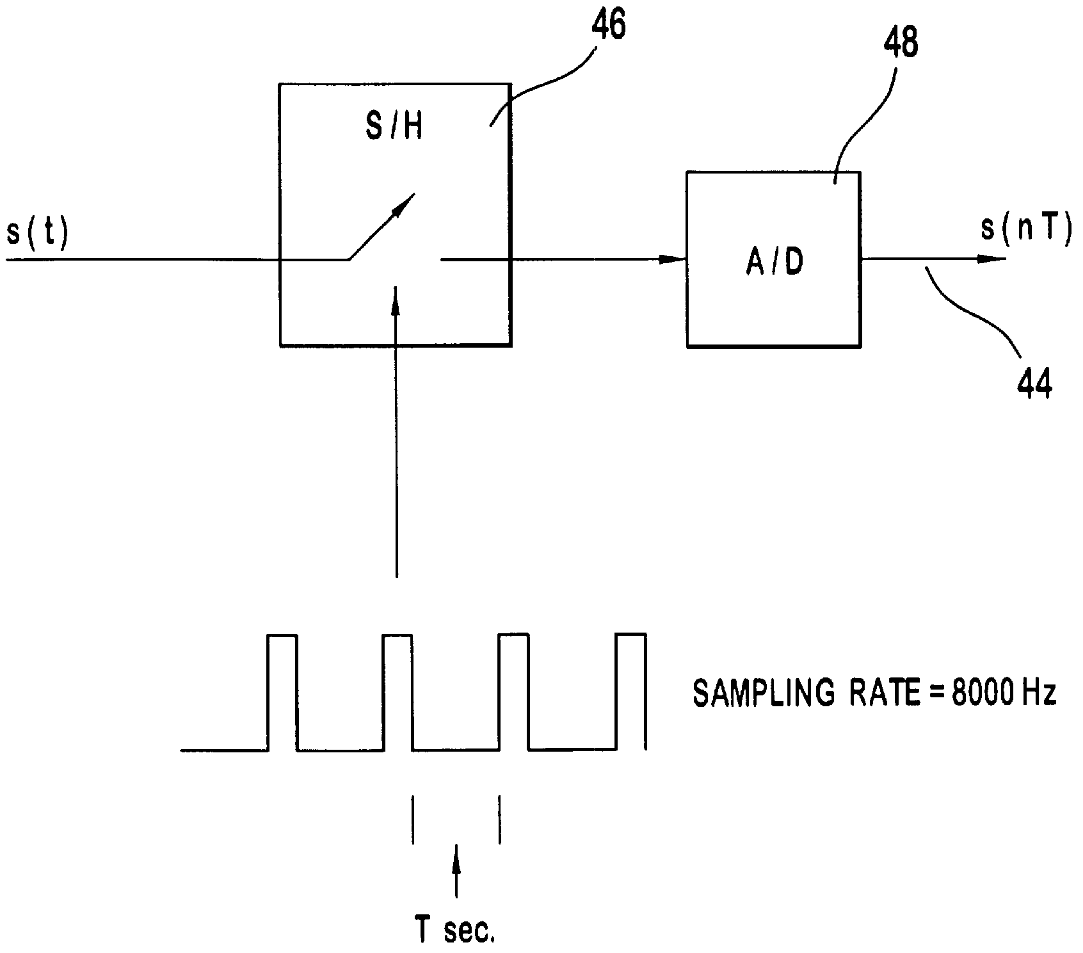
FIG. 2 is a block diagram of a sample/hold and A/D circuit used in the system of FIG. 1.

The operation of the aforesaid system is described as follows: The original speech is digitized using sample/hold and A/D circuitry 44 comprising a sample and hold block 46 and an analog to digital block 48. (FIG. 2). The sampling rate is 8 kHz. The digitized speech signal, s(n), is analyzed on a block basis, meaning that before analysis can begin, N samples of s(n) must be acquired. Once a block of speech samples s(n) is acquired, it is passed to the preemphasis filter 12 which has a z-transform function $$P(z)=1-\alpha^{*}z^{-1} \tag{1}$$

Figure 3:
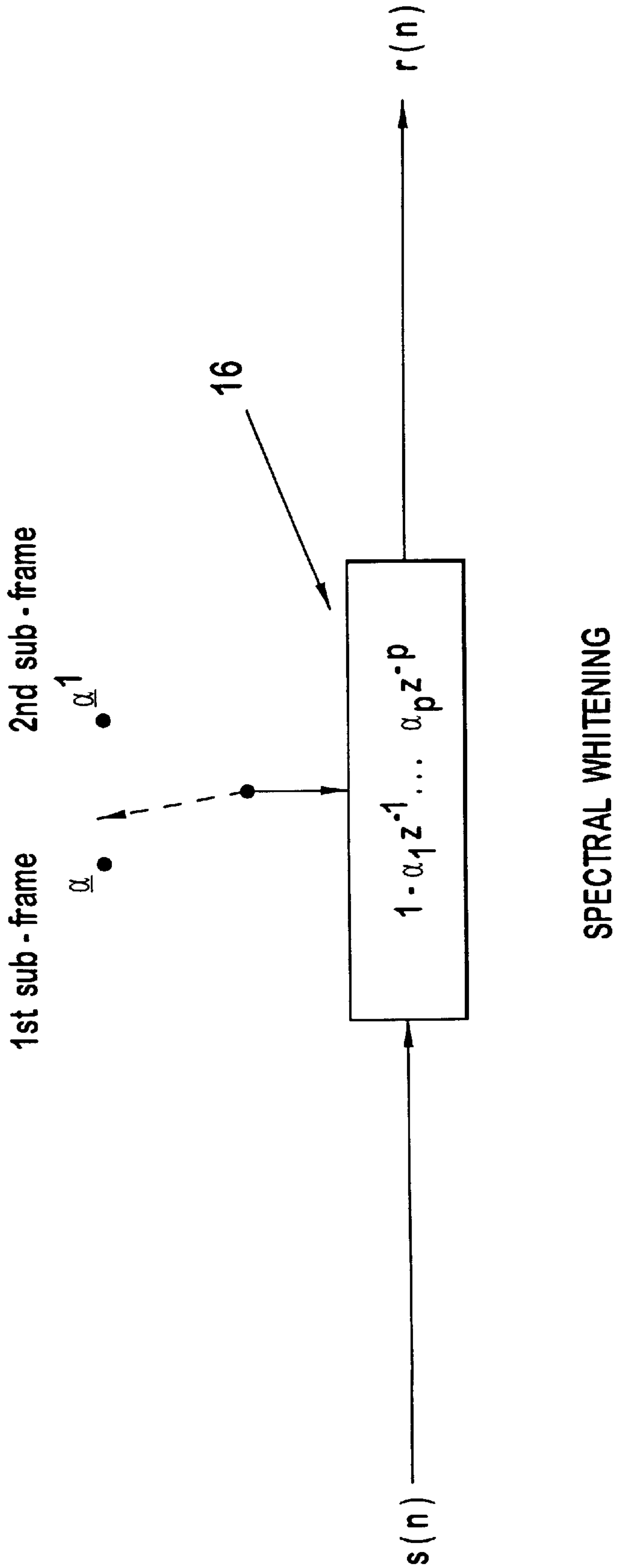
FIG. 3 is a block diagram of the spectral whitening circuit of FIG. 1.
Figure 5:
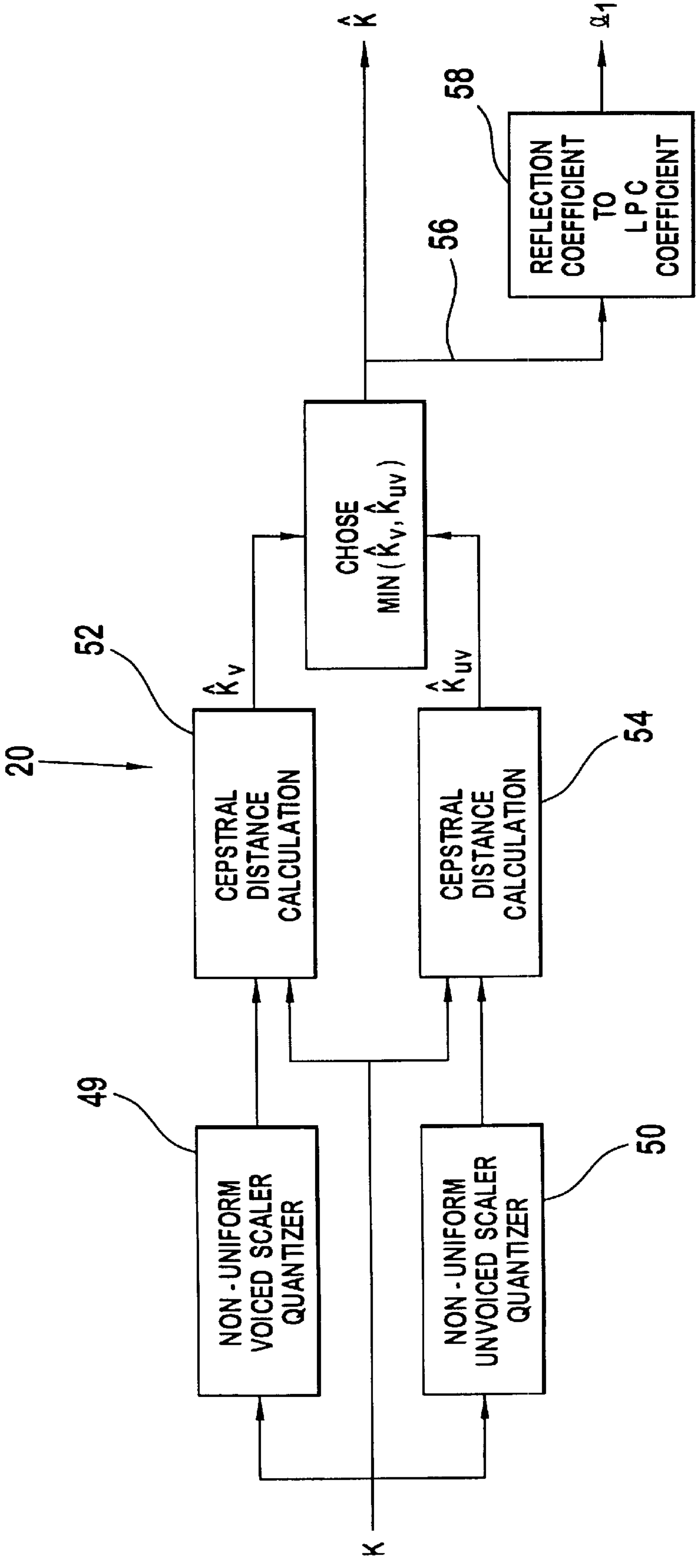
FIG. 5 is a block diagram of the reflection coefficient quantization circuit of FIG. 1.

It is then passed to the LPC analysis block 14 from which the signal K is fed to the reflection coefficient quantizer and LPC converter whitening block 20, (shown in detail in FIG. 3). The LPC analysis block 14 produces LPC reflection coefficients which are related to the all-pole filter coefficients. The reflection coefficients are then quantized in block 20 in the manner shown in detail in FIG. 5 wherein two sets of quantizer tables are previously stored. One set has been designed using training databases based on voiced speech, while the other has been designed using unvoiced speech. The reflection coefficients are quantized twice; once using the voiced quantizer 49 and once using the unvoiced quantizer 50. Each quantized set of reflection coefficients is converted to its respective spectral coefficients, as at 52 and 54, which, in turn, enables the computation of the log-spectral distance between the unquantized spectrum and the quantized spectrum. The set of quantized reflection coefficients which produces the smaller log-spectral distance shown at 56, is then retained. The retained reflection coefficient parameters are encoded for transmission and also converted to the corresponding all-pole LPC filter coefficients in block 58.

Following the reflection quantization and LPC coefficient conversion, the LPC filter parameters are interpolated using the scheme described herein. As previously discussed, LPC analysis is performed on speech of block length N which corresponds to N/8000 seconds (sampling rate=8000 Hz). Therefore, a set of filter coefficients is generated for every N samples of speech or every N/8000 sec.

Figure 6:
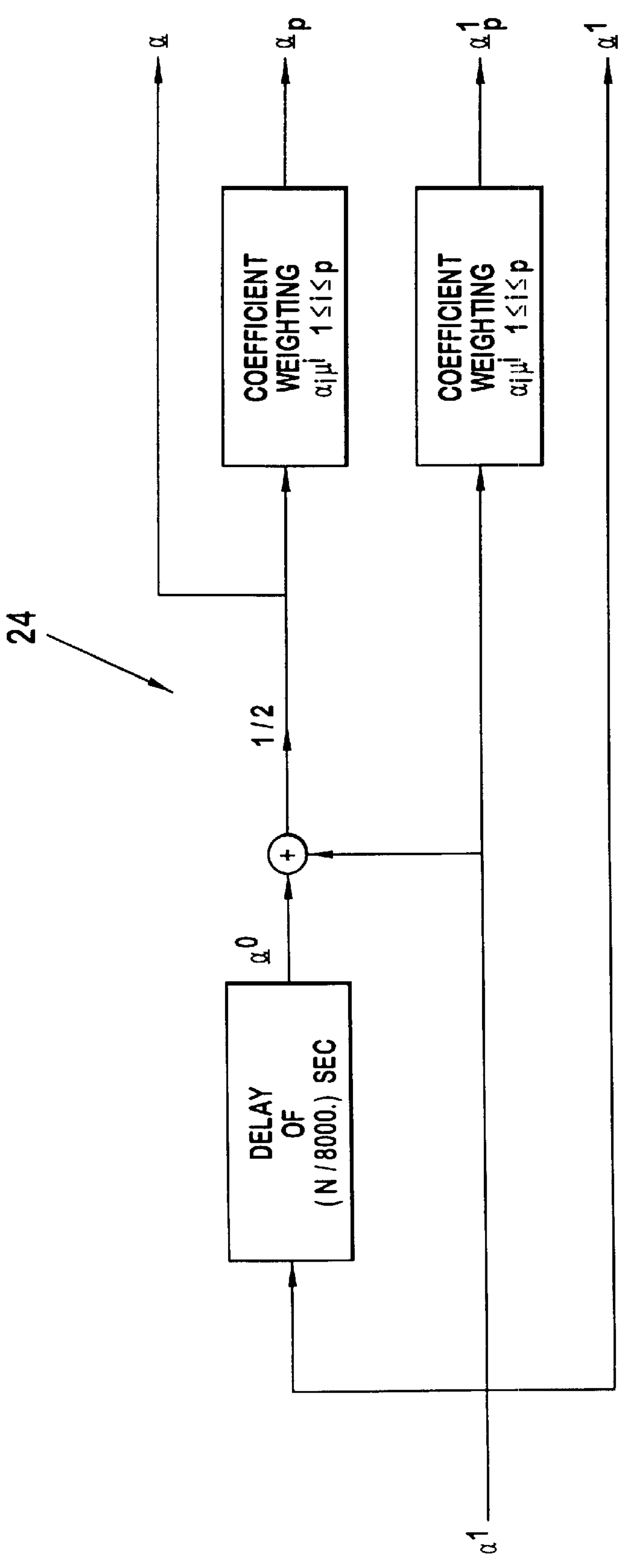
FIG. 6 is a block diagram of the LFC interpolation/weighting circuit of FIG. 1.

In order to enhance spectral trajectory tracking, the LPC filter parameters are interpolated on a sub-frame basis at block 24 where the sub-frame rate is twice the frame rate. The interpolation scheme is implemented (as shown in detail in FIG. 6) as follows: let the LPC filter coefficients for frame k-1 be $\alpha^0$ and for frame k be $\alpha^1$. The filter coefficients for the first sub-frame of frame k is then $$\underline{\alpha}=(\underline{\alpha}^0+\underline{\alpha}^1)/2 \tag{2}$$

and $\alpha$ parameters are applied to the second sub-frame. Therefore a different set of LPC filter parameters are available every 0.5*(N/8000) sec.

Pitch Analysis

Prior methods of pitch filter implementation for multi-pulse LPC coders have focused on closed loop pitch analysis methods (U.S. Pat. No. 4,701,954). However, such closed loop methods are computationally expensive. In the present invention the pitch analysis procedure indicated by block 28, is performed in an open loop manner on the speech spectral residual signal. Open loop methods have reduced computational requirements. The spectral residual signal is generated using the inverse LPC filter which can be represented in the z-transform domain as A(z); A(z)=1/H(z) where H(z), is the LPC all-pole filter. This is known as spectral whitening and is represented by block 16. This block 16 is shown in detail in FIG. 3. The spectral whitening process removes the short-time sample correlation which in turn enhances pitch analysis.

Figure 7:
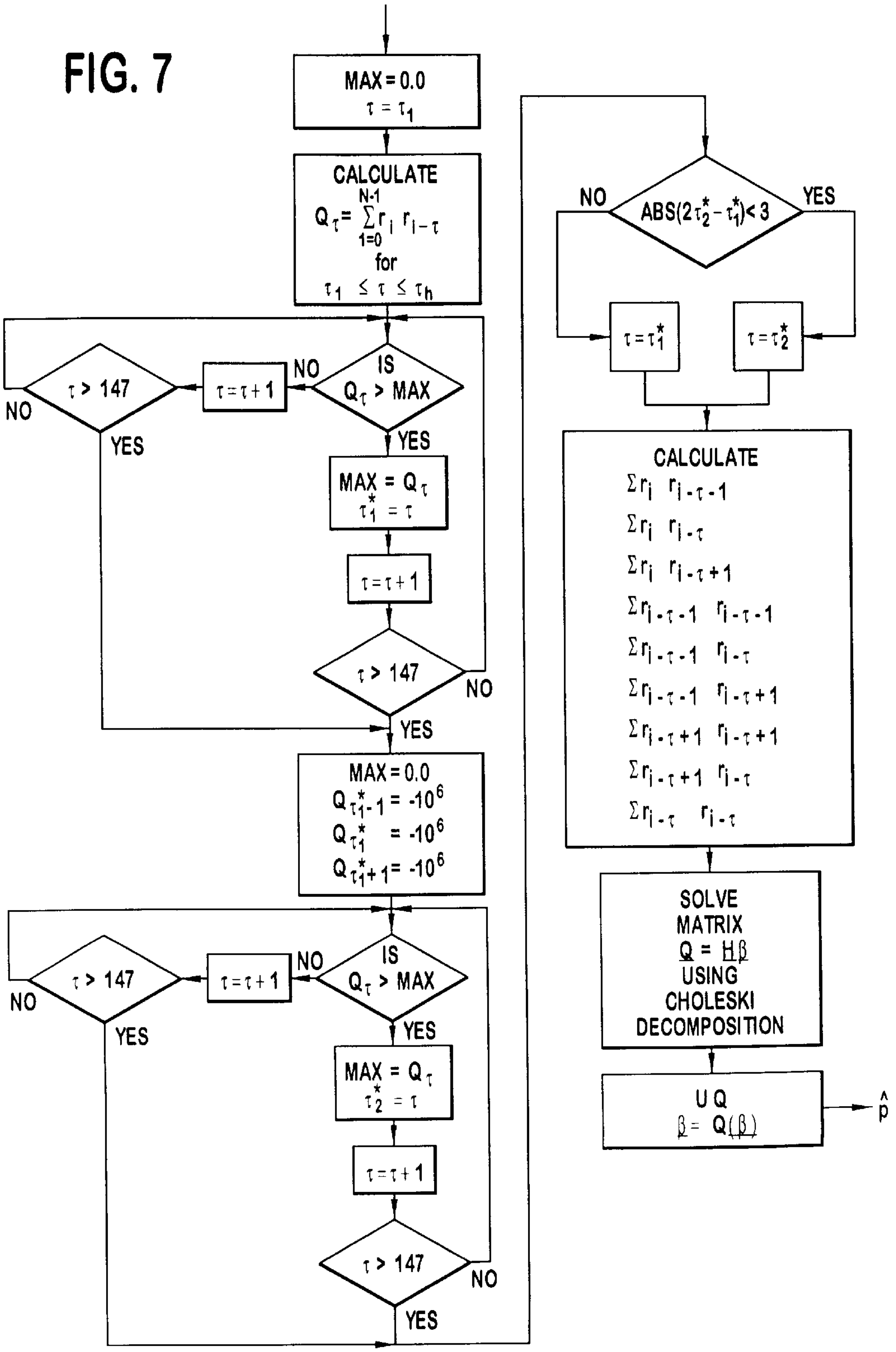
FIG. 7 is a flow chart diagram of the pitch analysis block of FIG. 1.

A flow chart diagram of the pitch analysis block 28 of FIG. 1 is shown in FIG. 7. The first step in the pitch analysis process is the collection of N samples of the spectral residual signal. This spectral residual signal is obtained from the pre-emphasized speech signal by the method illustrated in FIG. 3. These residual samples are appended to the prior K retained residual samples to form a segment, r(n), where $-K \leqq n \leqq N$.

The autocorrelation Q(i) is performed for $\tau_l \leqq i \leqq \tau_h$ or $$Q(i)=\sum_{n=-K}^{N} r(n)r(n-i) \qquad r_l \le i \le r_h \tag{3}$$

The limits of i are arbitrary but for speech sounds a typical range is between 20 and 147 (assuming 8 kHz sampling). The next step is to search Q(i) for the max value, $M_1$, where $$M_1=\max(Q(i))=Q(k_1) \tag{4}$$

The value k is stored and $Q(k_1-1)$, $Q(k_1)$, and $Q(K_1+1)$ are set to a large negative value. We next find a second value $M_2$ where $$M_2=\max(Q(i))=Q(k_2) \tag{5}$$

The values $k_1$ and $k_2$ correspond to delay values that produce the two largest correlation values. The values $k_1$ and $k_2$ are used to check for pitch period doubling. The following algorithm is employed: If the $\mathrm{ABS}(k_2-2^{*}k_1)<C$, where C can be chosen to be equal to the number of taps (3 in this invention, then the delay value, D, is equal to $k_2$ otherwise $D=k_1$. Once the frame delay value, D, is chosen the 3-tap gain terms are solved by first computing the matrix and vector values in eq. (6).

$$\begin{bmatrix} \sum r(i)r(n-\tau-1) \\ \sum r(n)r(n-i) \\ \sum r(n)r(n-i+1) \end{bmatrix} = \begin{bmatrix} \sum r(n-i-1)r(n-i-1) & \sum r(n-i)r(n-i-1) & \sum r(n-i+1)r(n-i-1) \\ \sum r(n-i-1)r(n-i) & \sum r(n-i)r(n-i) & \sum r(n-i+1)r(n-i) \\ \sum r(n-i-1)r(n-i+1) & \sum r(n-i)r(n-i+1) & \sum r(n-i+1)r(n-i+1) \end{bmatrix} \tag{6}$$

The matrix is solved using the Choleski matrix decomposition. Once the gain values are calculated, they are quantized using a 32 word vector codebook. The codebook index along with the frame delay parameter are transmitted. The P signifies the quantized delay value and index of the gain codebook.

Excitation Analysis

Figure 8:
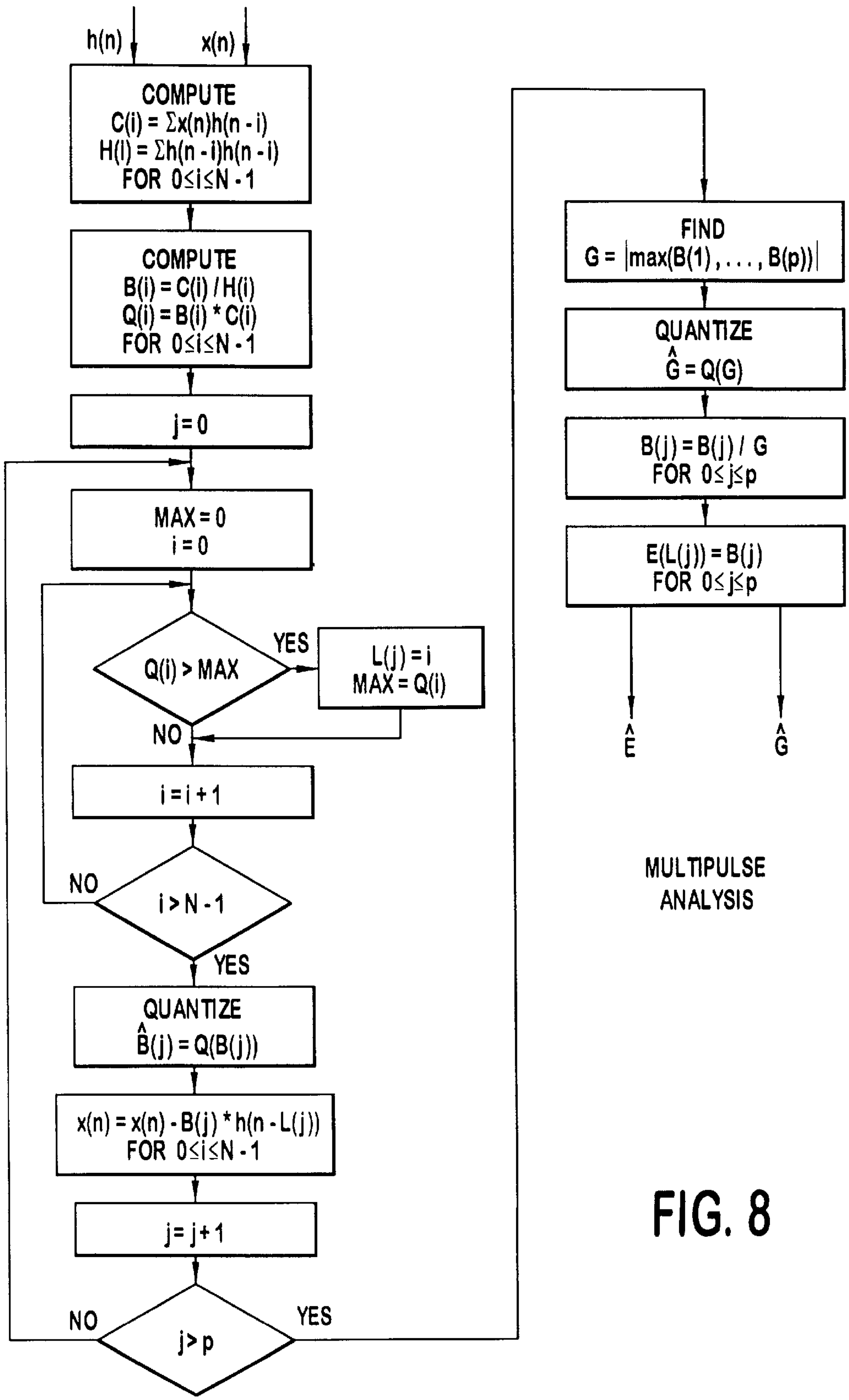
FIG. 8 is a flow chart diagram of the multipulse analysis block of FIG. 1.
Figure 9:
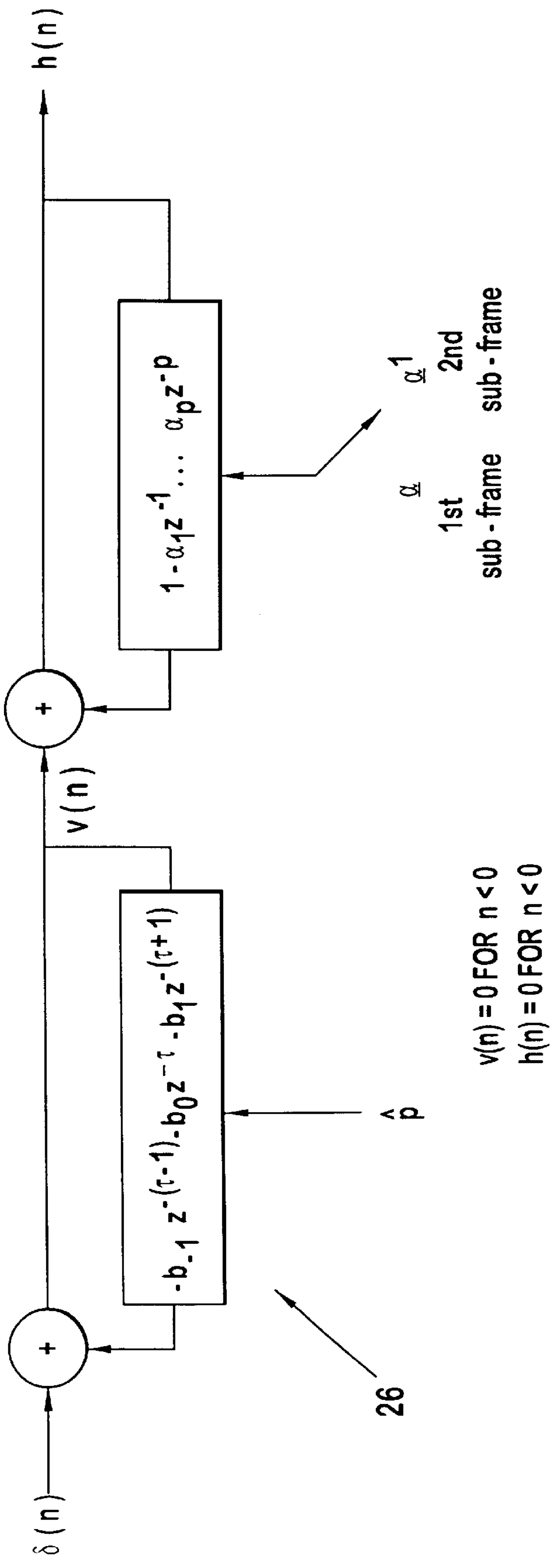
FIG. 9 is a block diagram of the impulse response generator of FIG. 1.

Multipulse's name stems from the operation of exciting a vocal tract model with multiple impulses. A location and amplitude of an excitation pulse is chosen by minimizing the mean-squared error between the real and synthetic speech signals. This system incorporates the perceptual weighting filter 18. A detailed flow chart of the multipulse analysis is shown in FIG. 8. The method of determining a pulse location and amplitude is accomplished in a systematic manner. The basic algorithm can be described as follows: let h(n) be the system impulse response of the pitch analysis filter and the LPC analysis filter in cascade; the synthetic speech is the system's response to the multipulse excitation. This is indicated as the excitation convolved with the system response or $$\hat{s}(n)=\sum_{k=1}^{n} ex(k)h(n-k) \tag{7}$$

where ex(n) is a set of weighted impulses located at positions $n_1, n_2, \ldots n_j$ or $$ex(n)=\beta_1\delta(n-n_1)+\beta_2\delta(n-n_2)+\ldots+\beta_j\delta(n-n_j) \tag{8}$$

The synthetic speech can be re-written as $$\hat{s}(n)=\sum_{j=1}^{J} B_j h(n-n_j) \tag{9}$$

In the present invention, the excitation pulse search is performed one pulse at a time, therefore j=1. The error between the real and synthetic speech is $$e(n)=s_p(n)-\hat{s}(n)-r(n) \tag{10}$$

Figure 4:
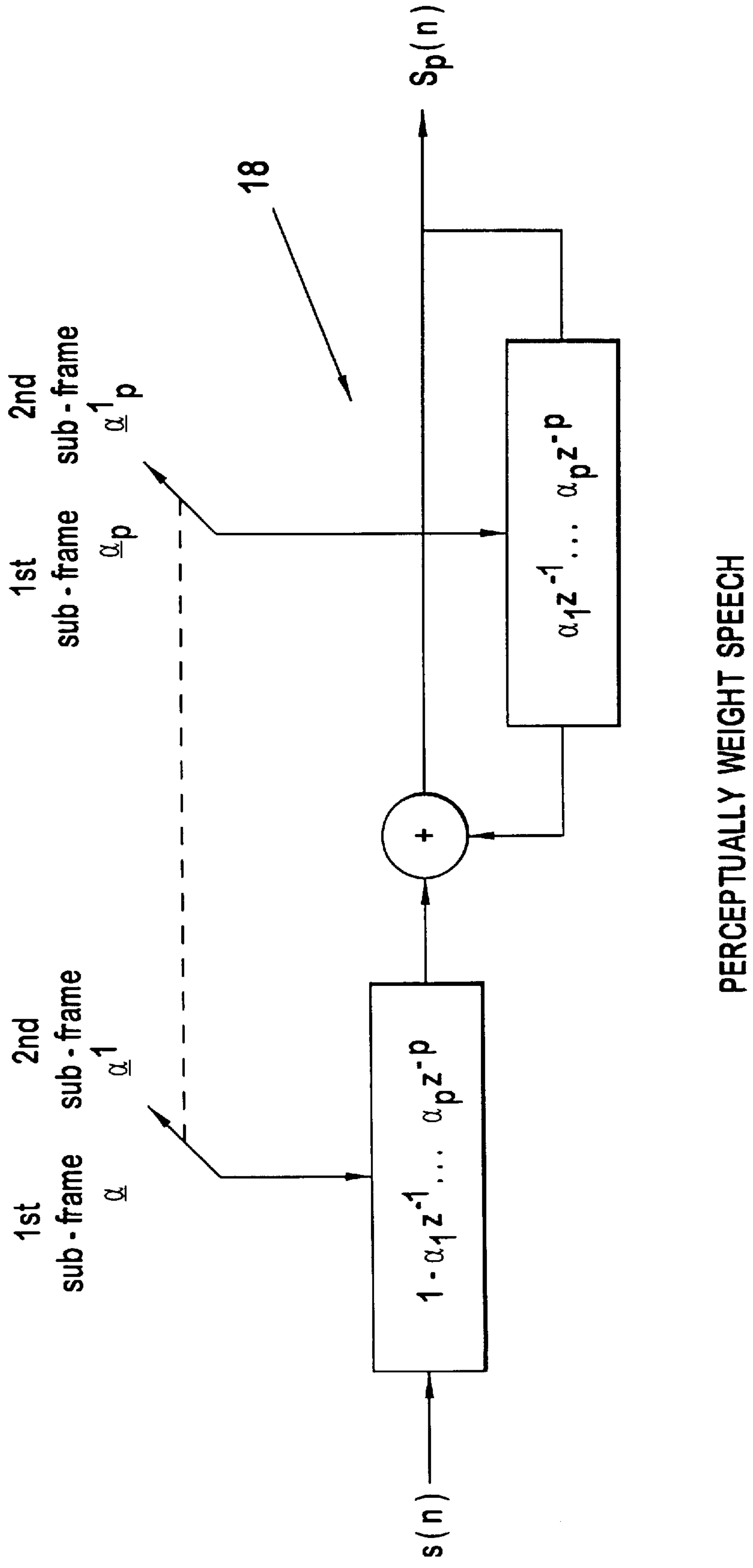
FIG. 4 is a block diagram of the perceptual speech weighting circuit of FIG. 1.
Figure 10:
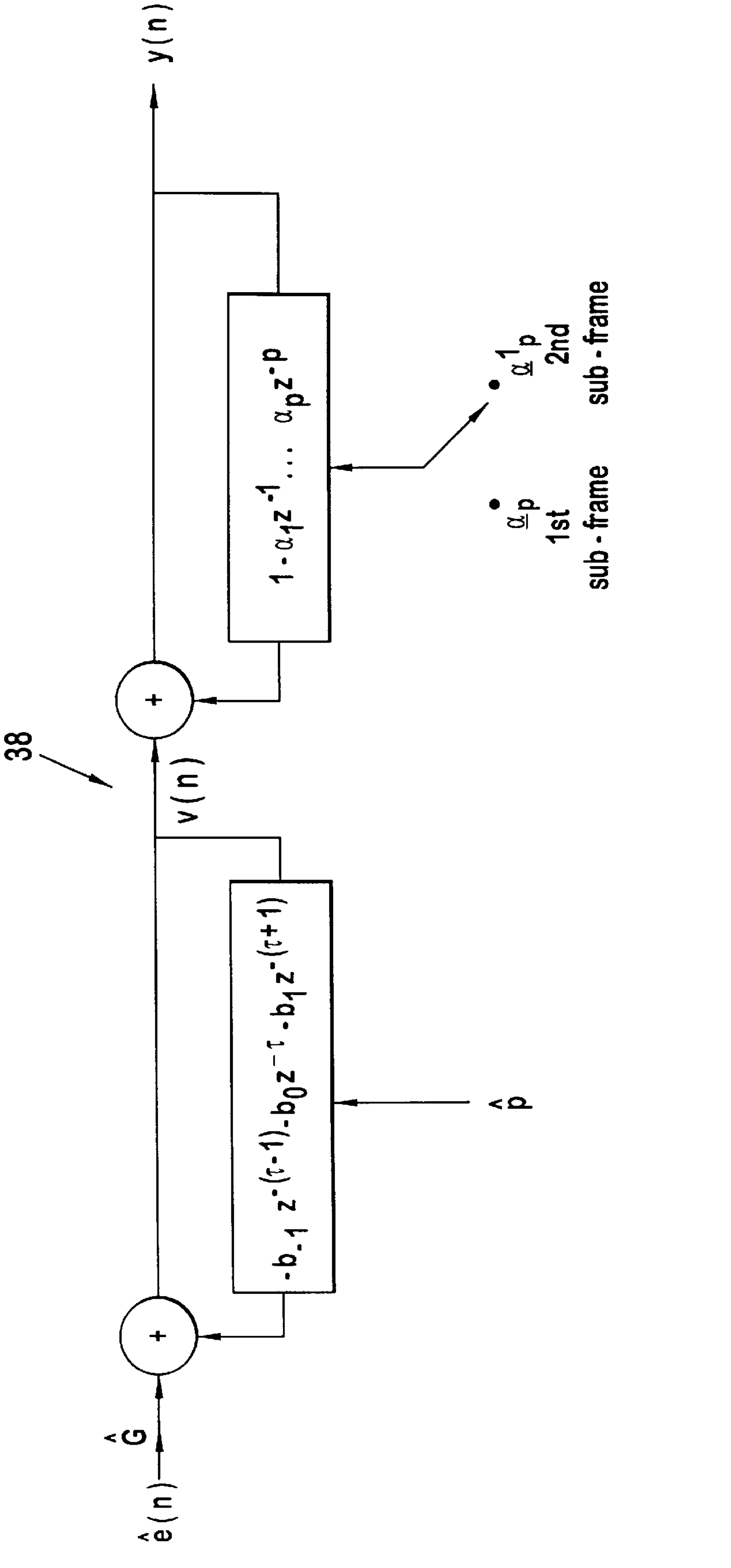
FIG. 10 is a block diagram of the perceptual synthesizer circuit of FIG. 1.
Figure 11:
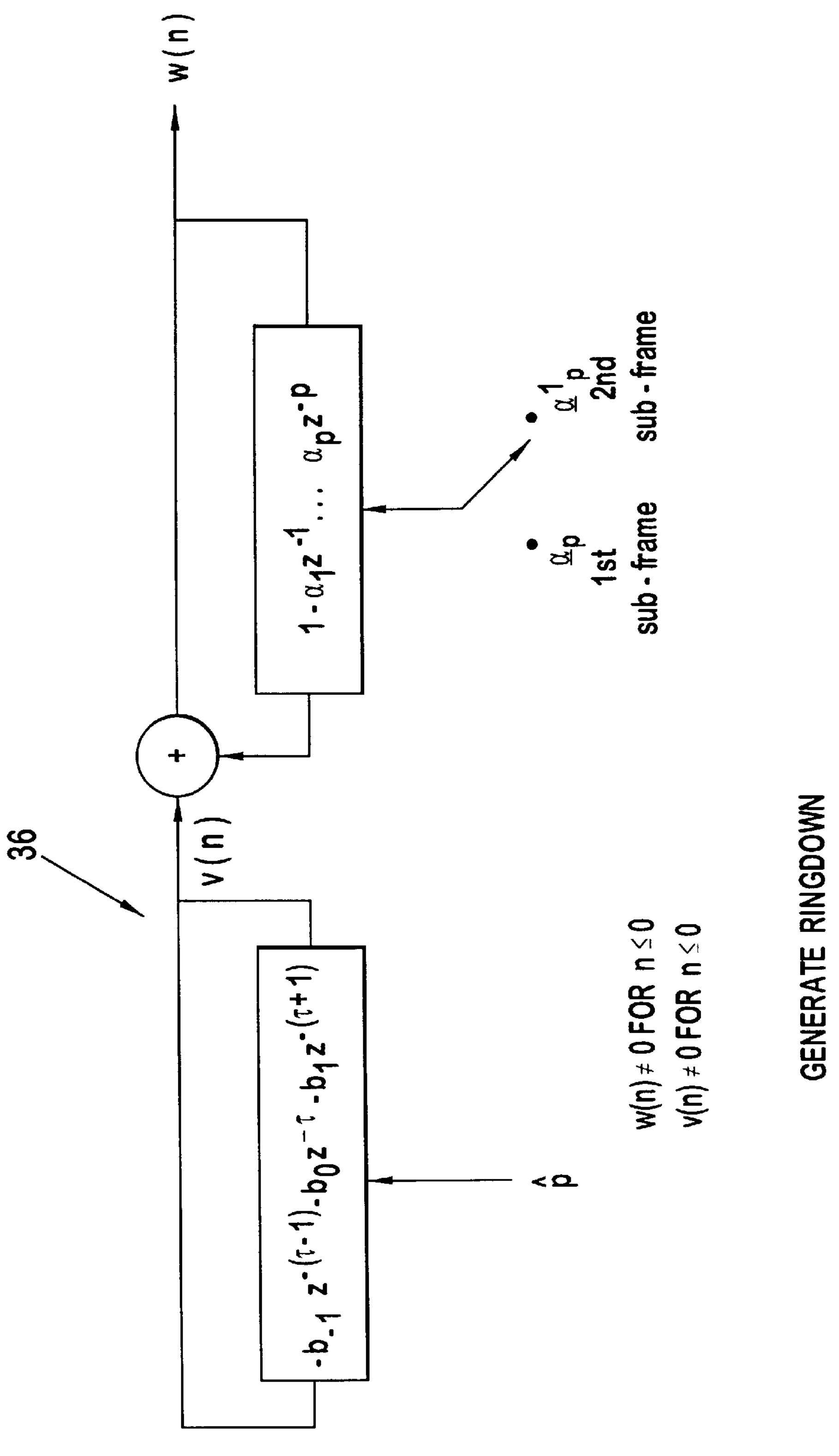
FIG. 11 is a block diagram of the ringdown generator circuit of FIG. 1.

The squared error $$E=\sum_{n=1}^{N} e^2(n) \tag{11}$$

or $$E=\sum_{n=1}^{N} (s_p(n)-\hat{s}(n)-r(n))^2 \tag{12}$$

where $s_p(n)$ is the original speech after pre-emphasis and perceptual weighting (FIG. 4) and r(n) is a fixed signal component due to the previous frames' contributions and is referred to as the ringdown component. FIGS. 10 and 11 show the manner in which this signal is generated, FIG. 10 illustrating the perceptual synthesizer 38 and FIG. 11 illustrating the ringdown generator 36. The squared error is now written as $$E=\sum_{n=1}^{N} (x(n)-B_1 h(n-n_j))^2 \tag{13}$$

where x(n) is the speech signal $s_p(n)-r(n)$ as shown in FIG. 1.

$$E=S-2BC+B^2H \tag{14}$$

where $$C=\sum_{n=1}^{N-1} x(n)h(n-n_j) \tag{15}$$

and $$S=\sum_{n=1}^{N-1} x^2(n) \tag{16}$$

and $$H=\sum_{n=1}^{N-1} h(n-n_1h(n-n_1) \tag{17}$$

The error, E, is minimized by setting the dE/dB=0 or $$dE/dB=-2C+2HB=0 \tag{18}$$

or $$B=C/H \tag{19}$$

The error, E, can then be written as $$E=S-C^2/H \tag{20}$$

From the above equations it is evident that two signals are required for multipulse analysis, namely h(n) and x(n). These two signals are input to the multipulse analysis block 32.

The first step in excitation analysis is to generate the system impulse response. The system impulse response is the concatentation of the 3-tap pitch synthesis filter and the LPC weighted filter. The impulse response filter has the z-transform:

$$H_p(z)=\frac{1}{1-\sum_{i=1}^{3} b_i z^{-\tau-i}}\,\frac{1}{1-\sum_{i=1}^{p} \alpha_i\mu^i z^{-i}} \tag{20}$$

The b values are the pitch gain coefficients, the α values are the spectral filter coefficients, and μ is a filter weighting coefficient. The error signal, e(n), can be written in the z-transform domain as $$E(z)=X(z)-\beta H_p(z)z^{-n1} \tag{21}$$

where X(z) is the z-transform of x(n) previously defined. The impulse response weight β, and impulse response time shift location $n_1$ are computed by minimizing the energy of the error signal, e(n). The time shift variable $n_1$ (1=1 for first pulse) is now varied from 1 to N. The value of $n_1$ is chosen such that it produces the smallest energy error E. Once $n_1$ is found $\beta_1$ can be calculated. Once the first location, $n_1$ and impulse weight, $\beta_1$, are determined the synthetic signal is written as $$\hat{s}(n)=\beta_1 h(n-n_1) \tag{22}$$

When two weighted impulses are considered in the excitation sequence, the error energy can be written as $$E=\Sigma(x(n)-\beta_1 h(n-n_1)-\beta_2 h(n-n_2))^2$$

Since the first pulse weight and location are known, the equation is rewritten as $$E=\Sigma(x'(n)-\beta_2 h(n-n_2))^2 \tag{23}$$

where $$x'(n)=x(n)-\beta_1 h(n-n_2) \tag{24}$$

The procedure for determining $\beta_2$ and $n_2$ is identical to that of determining $\beta_1$ and $n_1$. This procedure can be repeated p times. In the present instantiation p=5. The excitation pulse locations are encoded using an enumerative encoding scheme.

Excitation Encoding

A normal encoding scheme for 5 pulse locations would take 5*Int($\log_2$ N+0.5), where N is the number of possible locations. For p=5 and N=80, 35 bits are required. The approach taken here is to employ an enumerative encoding scheme. For the same conditions, the number of bits required is 25 bits. The first step is to order the pulse locations (i.e. 0 L1≦L2≦L3≦L4≦L5≦N−1 where L1=min ($n_1$, $n_2$, $n_3$, $n_4$, $n_5$) etc.). The 25 bit number, B, is:

$$B=\binom{L1}{1}+\binom{L2}{2}+\binom{L3}{3}+\binom{L4}{4}+\binom{L5}{5}$$

Figure 12:
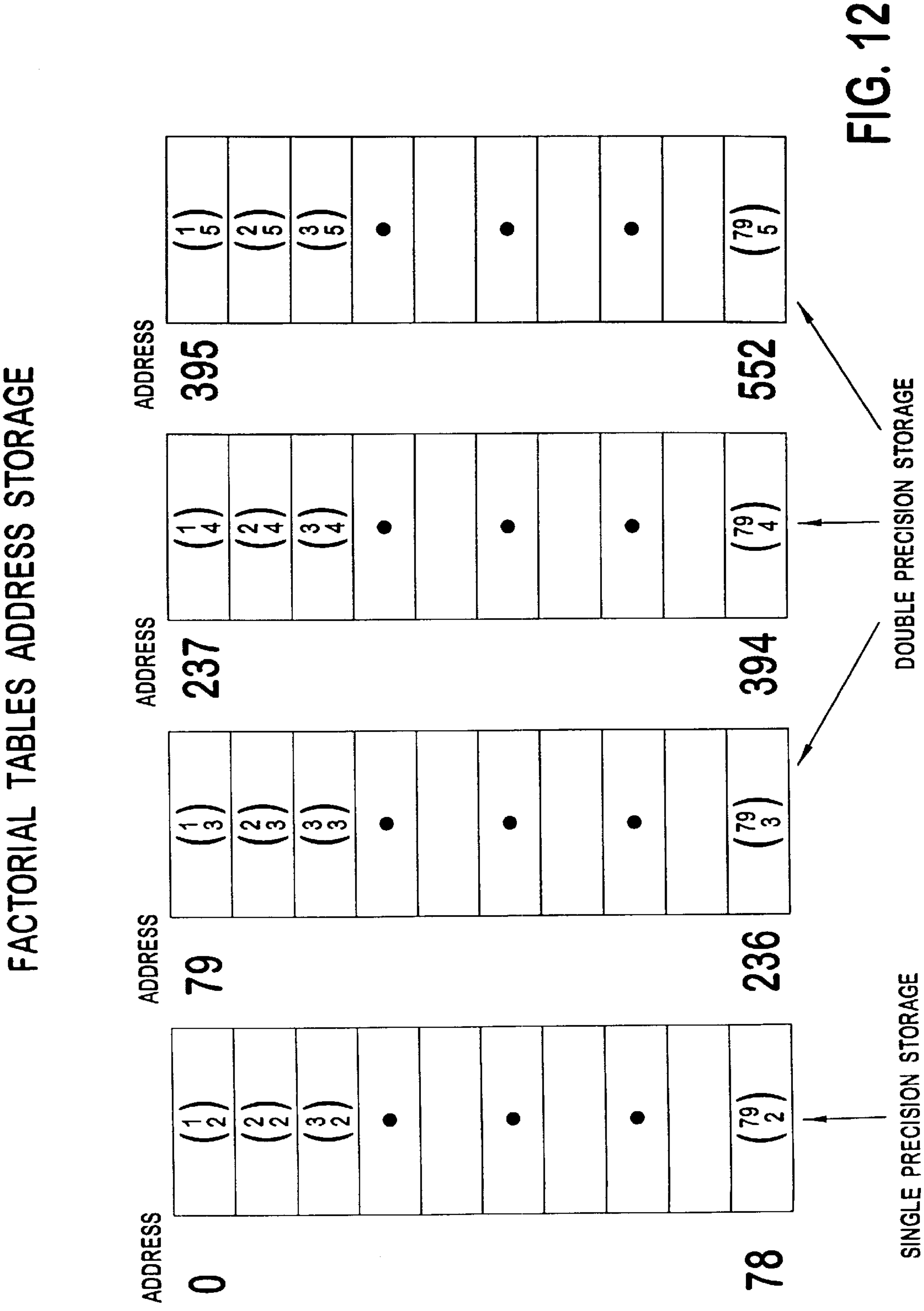
FIG. 12 is a diagrammatic view of the factorial tables address storage used in the system of FIG. 1.

Computing the 5 sets of factorials is prohibitive on a DSP device, therefore the approach taken here is to pre-compute the values and store them on a DSP ROM. This is shown in FIG. 12. Many of the numbers require double precision (32 bits). A quick calculation yields a required storage (for N=80) of 790 words ((N−1)*2*5). This amount of storage can be reduced by first realizing $\binom{L1}{1}$ is simply L1; therefore no storage is required. Secondly, $\binom{L2}{2}$ contains only single precision numbers; therefore storage can be reduced to 553 words. The code is written such that the five addresses are computed from the pulse locations starting with the 5th location (Assumes pulse location range from 1 to 80). The address of the 5th pulse is 2*L5+393. The factor of 2 is due to double precision storage of L5's elements. The address of L4 is 2*L4+235, for L3, 2*L3+77, for L2, L2-1. The numbers stored at these locations are added and a 25-bit number representing the unique set of locations is produced.

A block diagram of the enumerative encoding schemes is listed.

Excitation Decoding

Decoding the 25-bit word at the receiver involves repeated subtractions. For example, given B is the 25-bit word, the 5th location is found by finding the value X such that $$B-\binom{79}{5}<0$$

$$B-\binom{X}{5}<0$$

$$B-\binom{X-1}{5}>0.$$

then L5=X−1. Next let $$B=B-\binom{L5}{5}.$$

The fourth pulse location is found by finding a value X such that $$B-\binom{L5-1}{4}<0$$

-continued $$B-\binom{X}{4}<0$$

$$B-\binom{X-1}{4}>0$$

then L4=X−1. This is repeated for L3 and L2. The remaining number is L1.

The invention claimed is:

1. A method of performing pitch analysis for use in encoding speech, the method comprising:

sampling a speech signal;

spectrally whitening the sampled speech signal to produce a spectral residual signal;

collecting samples of the spectral residual signal and autocorrelating the collected samples;

determining maximum values of the correlated result;

determining gain values based at least in part on the maximum values of the correlated result; and quantizing the gain values using a codebook to produce a codebook index and an associated frame delay, the codebook index and the frame delay representing a pitch of the speech signal and facilitate encoding the speech signal as a representation of the original speech signal.

2. The method of claim 1 further comprising pre-emphasizing the sampled speech signal prior to the spectral whitening.

3. The method of claim 2 wherein the pre-emphasizing takes a z-transform of the sampled speech signal.

4. The method of claim 1 wherein the spectral whitening uses an inverse linear predictive all-pole filter to produce the spectral residual signal.

5. The method of claim 1 wherein the collected samples are collected in a block of N samples and the block is appended to K prior samples to form a segment and the autocorrelating is performed on the segment.

6. The method of claim 1 wherein the maximum values are two maximum values.

7. The method of claim 1 wherein the gain values are 3-tap gain terms.

8. The method of claim 7 wherein the 3-tap gain terms are determined using Choleski matrix decomposition.

9. The method of claim 1 wherein the code book is a 32 word vector code book.

10. An apparatus for analyzing pitch to encode a speech signal, the apparatus comprising:

a spectral whitening block having an input which receives digital speech signal samples of an original speech signal and outputs spectral residual signal samples;

a pitch analysis block coupled to the spectral whitening block to collect spectral residual signal samples, autocorrelate the collected samples and output gain values based at least in part on maximum values of the correlated result; and a quantizer block coupled to said pitch analysis block using a codebook to produce a codebook index and an associated frame delay, the codebook index and the frame delay are outputted as quantized gain values representing a pitch of the speech signal, the quantized values facilitate encoding the speech signal as a representation of the original speech signal.

11. The apparatus of claim 10 further comprising a pre-emphasis block coupled to the input of the spectral whitening block to pre-emphasize the sampled speech signal.

12. The apparatus of claim 11 further comprising a sample and hold block coupled to an analog to digital converter to produce the speech signal samples.

13. The apparatus of claim 10 further comprising a bit packing block coupled to the quantizing block to combine the quantized values with other parameters of the encoded speech signal.

14. The apparatus of claim 13 further comprising a synthesizer/post filter block coupled to the bit packing block and having an input for receiving the combined result.

15. The apparatus of claim 10 wherein the spectral whitening block having an additional input for receiving linear predictive all-pole filter parameters and the spectral whitening block uses the linear predictive all-pole filter parameters to produce the spectral residual signal.

16. An apparatus for analyzing pitch to encode a speech signal, the apparatus comprising:

means for sampling a speech signal;

means for spectrally whitening the sampled speech signal to produce a spectral residual signal;

means for collecting samples of the spectral residual signal and autocorrelating the collected samples;

means for determining maximum values of the correlated result;

means for determining gain values at least in part on the maximum values of the correlated result; and means for quantizing the gain values using a codebook to produce a codebook index and an associated frame delay, the codebook index and the frame delay representing a pitch of the speech signal and facilitate encoding the speech signal as a representation of the original speech signal.

17. The apparatus of claim 16 wherein the means for spectral whitening uses an inverse linear predictive all-pole filter to produce the spectral residual signal.

* * * * *